(12) United States Patent
Monta et al.

(10) Patent No.: US 7,046,677 B2
(45) Date of Patent: May 16, 2006

(54) METHOD AND APPARATUS FOR TIME-MULTIPLEXED PROCESSING OF MULTIPLE DIGITAL VIDEO PROGRAMS

(75) Inventors: Peter Monta, Palo Alto, CA (US); Edward Krause, San Mateo, CA (US); Adam Tom, San Francisco, CA (US)

(73) Assignee: RGB Networks, Inc., San Mateo, CA (US)

( * ) Notice: Subject to any disclaimer, the term of this patent is extended or adjusted under 35 U.S.C. 154(b) by 0 days.

(21) Appl. No.: 10/723,253

(22) Filed: Nov. 26, 2003

(65) Prior Publication Data

US 2004/0160960 A1 Aug. 19, 2004

Related U.S. Application Data

(60) Provisional application No. 60/429,819, filed on Nov. 27, 2002.

(51) Int. Cl.
*H04L 12/56* (2006.01)
*H04L 12/28* (2006.01)

(52) U.S. Cl. ............ 370/395.4; 370/392; 370/389; 370/410

(58) Field of Classification Search ........ 370/230–236, 370/395.21–395.31, 412–418, 395.7–395
See application file for complete search history.

(56) References Cited

U.S. PATENT DOCUMENTS

| 5,216,503 A | 6/1993 | Paik et al. |
| 5,844,890 A * | 12/1998 | Delp et al. .................. 370/230 |
| 5,862,140 A | 1/1999 | Shen et al. |
| 6,215,767 B1 * | 4/2001 | Li .............................. 370/230 |
| 6,728,270 B1 | 4/2004 | Meggers et al. |
| 2002/0122387 A1 * | 9/2002 | Ni .............................. 370/231 |
| 2003/0233464 A1 | 12/2003 | Walpole et al. |

OTHER PUBLICATIONS

John L. Hennessy et al., Computer Architecture: A Quantitative Approach, Third Edition, Ch. 5, Morgan Kaufmann, Hardcover, 3rd edition, Published May 2002, 1100 pages, ISBN 1558605967, pp. 460-489.

\* cited by examiner

*Primary Examiner*—Hanh Nguyen
*Assistant Examiner*—Thai Hoang
(74) *Attorney, Agent, or Firm*—Lipsitz & McAllister, LLC

(57) ABSTRACT

The present invention relates generally to the processing of multiple data streams with common resources. More particularly, this invention relates to a technique for time-multiplexed processing of, for example, multiple digital video programs. In one embodiment, an exemplary method provides for time-multiplexed processing of a set of digital streams includes storing each received packet in a random access memory. For each stream, the deadline for the arrival of the next packet at the receiver is determined and a priority based on the deadline is assigned. The stream with the highest assigned priority is identified as an identified stream. In some embodiments, the processing state of the identified stream is then restored. One or more packets of data corresponding to the identified stream are retrieved from random access memory to produce retrieved packets. The processing state is saved after the retrieved packets have been processed.

32 Claims, 16 Drawing Sheets

```
mem_allocate (d, i, j, k) begin
  if (d > k) begin
    D(i, j) = 0
    return (addr(i, j))
end
k=k / 2
if (d <= D(i+k, j+k) and
    (d > D(i+k, j-k) or D(i+k, j-k) >= D(i+k, j+k)) and
    (d > D(i-k, j+k) or D(i-k, j+k) >= D(i+k, j+k)) and
    (d > D(i-k, j-k) or D(i-k, j-k) >= D(i+k, j+k)))
    a = mem_allocate( d, i+k, j+k, k)
else if (d <= D(i+k, j-k) and
        (d > D(i-k, j+k) or D(i-k, j+k) >= D(i+k, j-k)) and
        (d > D(i-k, j-k) or D(i-k, j-k) >= D(i+k, j-k)))
    a = mem_allocate ( d, i+k, j-k, k)
else if ( d <=D(i-k, j+k) and
        (d > D(i-k, j-k) or D(i-k, j-k) >= D(i-k, j+k)))
    a = mem_allocate( d, i-k, j+k, k)
else
    a = mem_allocate( d, i-k, j-k, k)
D(i, j) = max( D(i+k, j+k), D(i+k, j-k), D(i-k, j+k), D(i-k, j-k))
return ( a )
end
```

FIG. 9

```
mem_free ( i, j, k ) begin
  D(i, j) = 2 * k
  while ( k < MEMSIZE/2 ) begin
    k = k * 2
    D(i, j) = max( D(i+k, j+k), D(i+k, j-k), D(i-k, j+k), D(i-k, j-k))
  end
end
```

FIG. 10

Map of Allocated and Unallocated Memory Units
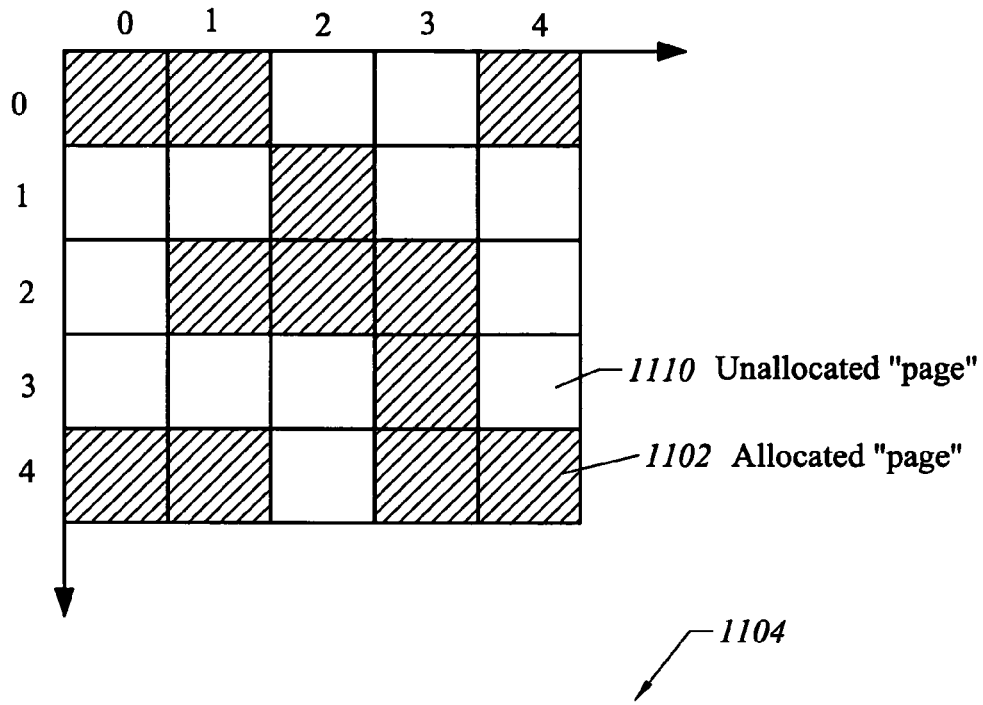
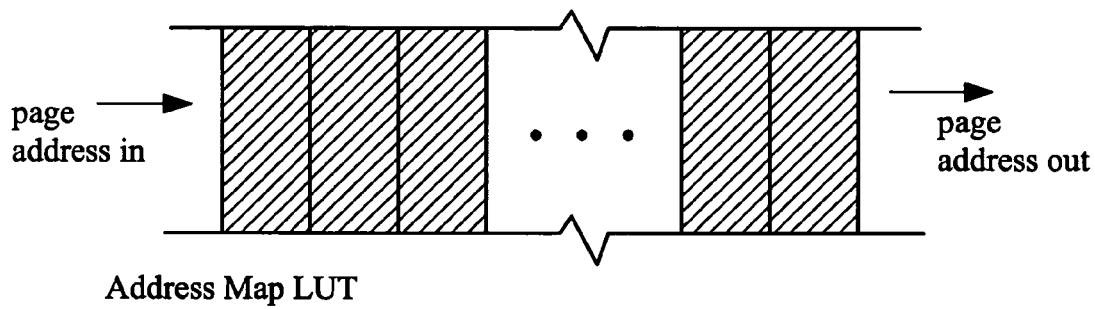
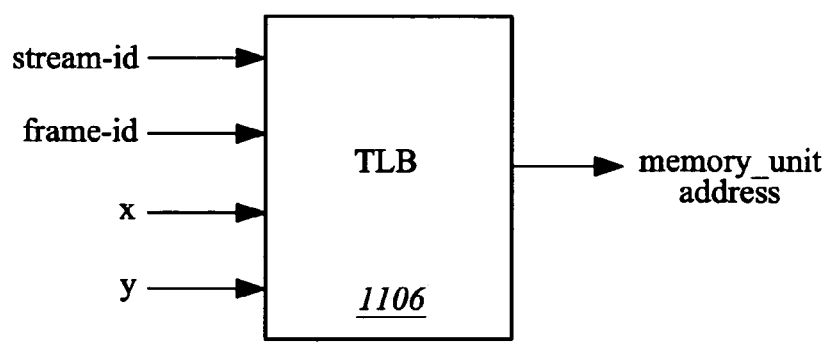
*FIG. 11*

```
address_generator ( ) begin
  m = 0
  n = 0
  input ( frame, x, y, xsize, ysize)
  while (n < ysize) begin
    x = xaddr + m
    y = yaddr + n
    block_addr = LUT { frame, y[ :7 ], x[ :7 ] }
    y_suboffset = y[6:4]
    x_suboffset = x[6:4]
    addr = { block_addr, y_suboffset, x_suboffset }
    y_offset = y[3:0]
    x_offset = x[3:0]
    output (addr, y_offset, x_offset)
    m = m + 16
    if ( m >= xsize ) begin
      n = n + 16
      m = 0
    end
  end
  return
end data_merge ( ) begin
  input ( x_size, y_size, x_offset, y_offset)
  n = 0
  while ( n < y_size ) begin
    i = 0
```

*FIG. 14*

```
while ( i < 16 ) begin
  m = 0
  while ( m < (x_offset + x_size) ) begin
    j = 0
    while (j < 16) begin
      input ( block_data )
      B[i][m] = block_data
      m = m + 1
      j = j + 1
    end
  end
  i = i + 1
end
if ( y_offset > 0 ) begin
  i = y_offset
  y_offset = 0
else
  i = 0
end while ( i < 16 and n < ysize) begin
  while ( j < x_size ) begin
    data = B[i][j + x_offset]
    output ( data )
    j = j + 1
  end
  i = i + 1
  n = n + 1
  end
 end
end
```

*FIG. 15*

METHOD AND APPARATUS FOR TIME-MULTIPLEXED PROCESSING OF MULTIPLE DIGITAL VIDEO PROGRAMS

REFERENCE TO RELATED APPLICATIONS

This application claims the benefit of U.S. Provisional Application No. 60/429,819, entitled "Method and Apparatus for Time-Multiplexed Processing of Multiple Digital Video Programs," filed Nov. 27, 2002, the contents of which are hereby incorporated by reference.

BRIEF DESCRIPTION OF THE INVENTION

This invention relates generally to the processing of multiple data streams with common resources. More particularly, this invention relates to a technique for time-multiplexed processing of, for example, multiple digital video programs.

BACKGROUND OF THE INVENTION

Many providers of digital content desire to deliver their content, which includes video, audio, etc., "on demand" to any requester, at any time. In particular, these providers are striving to enable viewers to access the entirety of their television programming free from a broadcast schedule. Typical television programming includes new-release movies, and all broadcast and premium television programs originating from various television networks. "Everything On Demand" ("EOD") and "Network Personal Video Recorder" ("nPVR") are terms coined to describe this type of on-demand service.

Presently, conventional video services technology, referred to as Video On Demand ("VOD"), is available to provide a limited amount of video in a time-shifted fashion. But there are drawbacks in using this technology to support EOD. For example, consider that viewers currently receive most of their content from broadcasted sources, and as such, the resources for providing VOD are primarily designed to deliver video to only a limited number of subscribers at one time. VOD resources, such as VOD servers and VOD distribution equipment, are not designed to provide most of a viewer's content in accordance with EOD. Thus, it would be prohibitively expensive to deploy sufficient VOD resources to provide a dedicated on-demand stream for each requester on a full-time basis.

Equipment needed for VOD and EOD service falls into one of three segments: servers, transport, and distribution. Servers store and playout video programs, while transport equipment propagates the video files and real-time streams between distribution sites and hubs, typically over optical fiber. Distribution equipment generally routes, switches, multiplexes, transrates, transcodes, scrambles, modulates and upconverts the video streams for final delivery to the home. Typically, distribution products are placed in cable headends, cable hubs, telephone company central offices, and other distribution centers.

A drawback to traditional VOD distribution equipment is that it lacks the capability to transrate, splice, route, and transcode video streams. Conventional VOD resources are also bandwidth inefficient and have inflexible switching capabilities. Further, many processes such as transrating, encoding, decoding, transcoding, and scrambling are usually implemented using hardware or software processes that are reliant on the continuity of the input streams, and thus, do not include the scheduling and state management resources necessary for a time-multiplexed, multiple-stream application. Instead, each stream processor must be implemented with sufficient resources to meet worst-case demands, and any multi-stream capabilities are achieved by replicating the entire stream processing sub-system. For this and other reasons, distribution as well as other resources are traditionally expensive and consume physical space in the distribution center unnecessarily.

In view of the foregoing, it would be highly desirable to overcome the drawbacks associated with the aforementioned techniques and structures for delivering content. It is also desirable to provide techniques and apparatus for reducing the cost and densities of distribution equipment when used to process a large number of video, audio, and data streams, and to deliver any video program in an on-demand, point-to-point, and unicast fashion.

BRIEF SUMMARY OF THE INVENTION

The invention includes a method for time-multiplexed processing of a set of digital streams including packets. Packets can include audio packets, video packets, data packets (i.e., packets of data that contain information that is neither audio nor video), etc. The packets are generally sequenced and timed for continuous real-time presentation. In one embodiment, the method includes storing each received packet in a memory, such as random access memory ("RAM"). For each stream, the deadline for the arrival of the next packet is determined and a priority is assigned based on the current time interval before the deadline. The stream with the highest assigned priority is identified, and in some case, tagged as an identified stream. In some embodiments, the processing state of the identified stream is then restored. One or more packets corresponding to the identified stream can be retrieved from memory to produce retrieved packets. The processing state is saved after the retrieved packets have been processed.

According to another embodiment of the invention, an apparatus is configured to perform time-multiplexed processing of a plurality of digital streams. A random access memory stores each received packet. For each stream there is a mechanism for determining the deadline for the arrival of the next packet at the receiver and assigning a priority based on the current time interval before the deadline. Some embodiments further include a mechanism that identifies the stream with the highest assigned priority. Another mechanism restores the processing state corresponding to the identified stream. A mechanism retrieves from random access memory one or more retrieved packets of data corresponding to the identified stream. Another mechanism saves the processing state after the retrieved packets have been processed.

This invention can be applied to the design and implementation of more efficient distribution products capable of processing many video, audio, and data streams simultaneously and at a reduced cost per stream. In addition, higher levels of integration and increased processing densities directly result in products that occupy less space in the video distribution center.

BRIEF DESCRIPTION OF THE FIGURES

The invention is more fully appreciated in connection with the following detailed description taken in conjunction with the accompanying drawings, in which:

FIG. 9 illustrates computer code that may be used to assign blocks of memory in accordance with an embodiment of the invention.

FIG. 10 illustrates computer code that may be used to release blocks of memory in accordance with an embodiment of the invention.

FIG. 11 illustrates memory management using small blocks of a fixed size in accordance with an embodiment of the invention.

FIG. 14 illustrates computer code implementing an address generator that may be used in accordance with an embodiment of the invention.

FIG. 15 illustrates computer code implementing a data merge module that may be used in accordance with an embodiment of the invention.

Like reference numerals refer to corresponding parts throughout the several views of the drawings.

DETAILED DESCRIPTION OF THE INVENTION

Figure 1:
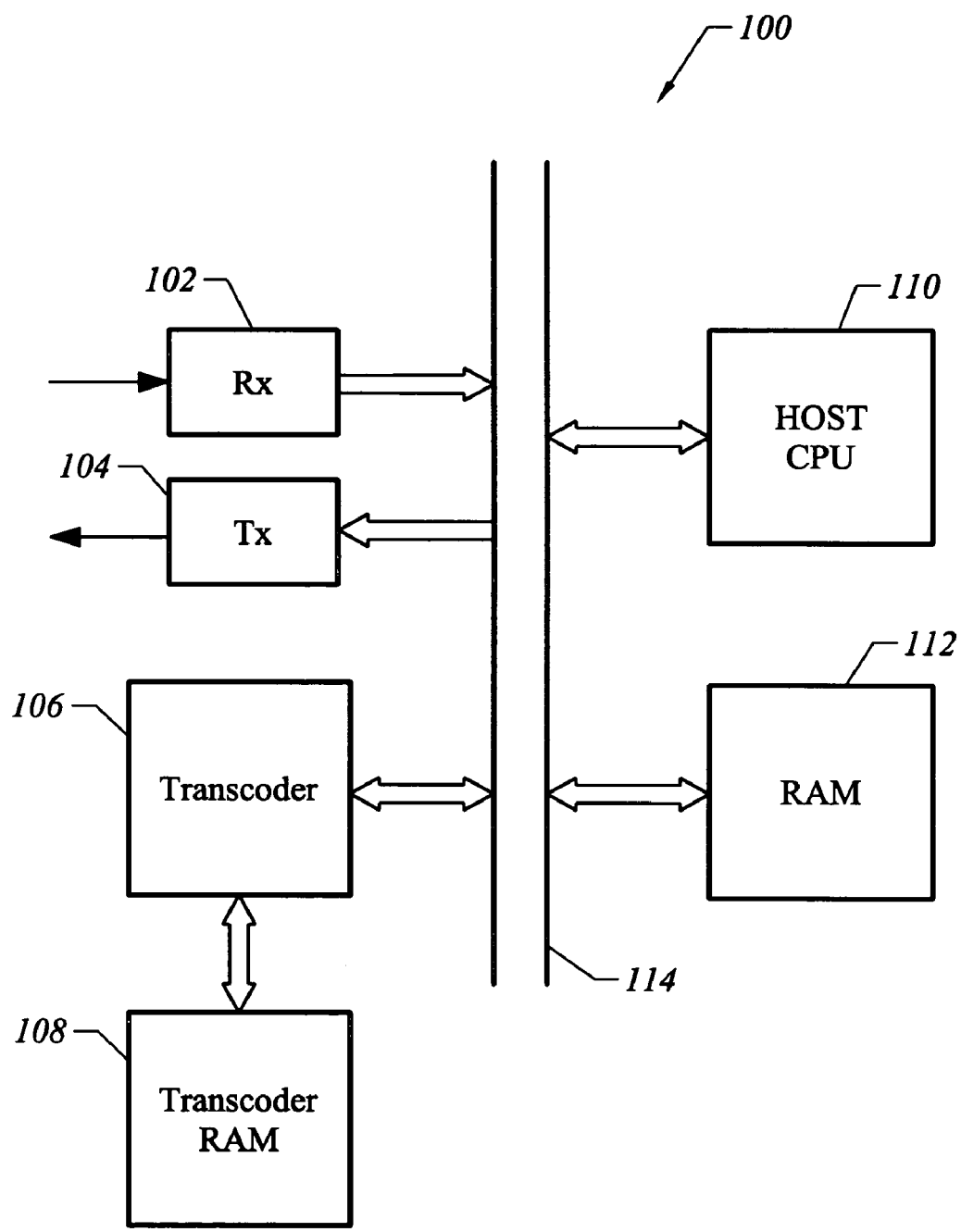
FIG. 1 illustrates a time-multiplexed single processor system that may be used in accordance with an embodiment of the present invention.

The invention is particularly useful in applications involving the processing of multiple digital video programs. A digital video program is defined to be a digital representation of a single stream or a combination of one or more video, audio, or data streams, wherein each stream is associated with a single program that is continuous in time. The data streams include streams of data packets that generally do not include audio or video, and hence are referred to as "non-A/V" data packets for non-audio/video data. The streams may be represented in uncompressed format, or compressed according to a known standard such as MPEG 1, MPEG 2, or MPEG 4. Furthermore, the process itself may be the application of a compression encode, decode, or transcode operation. In the transcoding case, the input stream may be received in one compression format and converted to another. Alternatively, a transcoder could be designed to alter certain characteristics of a compressed program, such as the compression ratio, while adhering to a single compression standard.

One of the challenges in implementing processes for video and/or audio streams is that the processes must be fast enough to keep up with the incoming rate at all times. This requirement typically results in an implementation that is over-designed in order to handle the worst case peaks in data rate, or to handle certain complex operations which, although rare, are possible and could occur repeatedly at random intervals. If the process is not designed to handle these worst-case conditions, then the processed data might be late in arriving at its destination, and the presentation of the video or audio signals could be interrupted. Alternatively, if the implementation is over-designed to prevent such presentation interruptions, then processing resources will frequently be idle during the intervals corresponding to more typical conditions.

A time-multiplexed, single-processor solution can alleviate the need to design for worst-case conditions. That is, by sharing the resources of a single process implementation, and by granting access to one signal at a time, it is possible to even out the variations that occur within each individual stream. Although it may be possible that all of the streams could hit their peak rate at the same time, or complex-processing conditions could occur simultaneously on each stream, such events may be so improbable that they can be safely ignored. This reduction in the probability of extreme variations as the number of independent signals increases is a well-known statistical phenomenon. In order to realize this statistical benefit in a time-multiplexed, single-processor system, a compatible scheduling system is needed. It is necessary to implement a policy where, for example, extra processing resources are automatically allocated to any single stream that experiences an abnormally high data rate or an unusually high number of events requiring extra attention. If the extra resources are not received, then delays could lead to an interruption in the presentation of the stream, even though other streams continue to be processed on time.

An optimized scheduling system is utilized in accordance with an embodiment of the invention. The scheduling system is configured to maintain each stream at the same operating point, where the operating point is defined to be the time interval before an interruption of the presentation process would occur if no additional data were to be processed for a given stream. A particular embodiment of such a system is described as follows.

A block diagram of a time-multiplexed single-processor system 100 is shown in FIG. 1. In this particular example, a transcoding process is applied to multiple compressed video streams. The transcoder 106 converts the compressed data from one representation to another. Each video stream is comprised of a sequence of frames, with each frame representing a single image that is representative of the video signal sampled at a particular instant in time. Each frame is further partitioned into a sequence of fixed-length packets, with the number of packets per frame varying, for example, according to the actual compression ratio that is observed at the time.

Packets containing compressed video data are received from the receiver module RX 102 and transferred via bus 114 to the Random Access Memory (RAM) 112 under the control of the host CPU 110. The module RX 102 can be any sort of input device, such as a terrestrial, cable, or satellite tuner/demodulator, or an Ethernet or similar network interface. The host CPU 110 assigns the address in RAM 112, and implements the process of scheduling packets for the transcoding operation. Selected packets are delivered to the transcoder in the proper sequence, while packets resulting from the transcoding process are returned back to the same RAM 112 so that they can be re-sequenced for transmission via module TX 104. The module TX 104 can be any sort of output device, such as a terrestrial, cable, or satellite modulator, or an Ethernet or similar network interface. Transcoder RAM 108 is configured to store both processor data and processor state information. As described herein, the term "state" or "processing state" refers to any type of data that needs to be saved when pausing the processing of a first stream and beginning or resuming the processing of a second stream. This saved data is needed in order to be able to resume the processing of the first stream at the same point where the interruption occurred. State data can include processing parameters (such as picture size or compression ratio), processing data (such as entire frames of video pixels) or any other like data.

Figure 2:
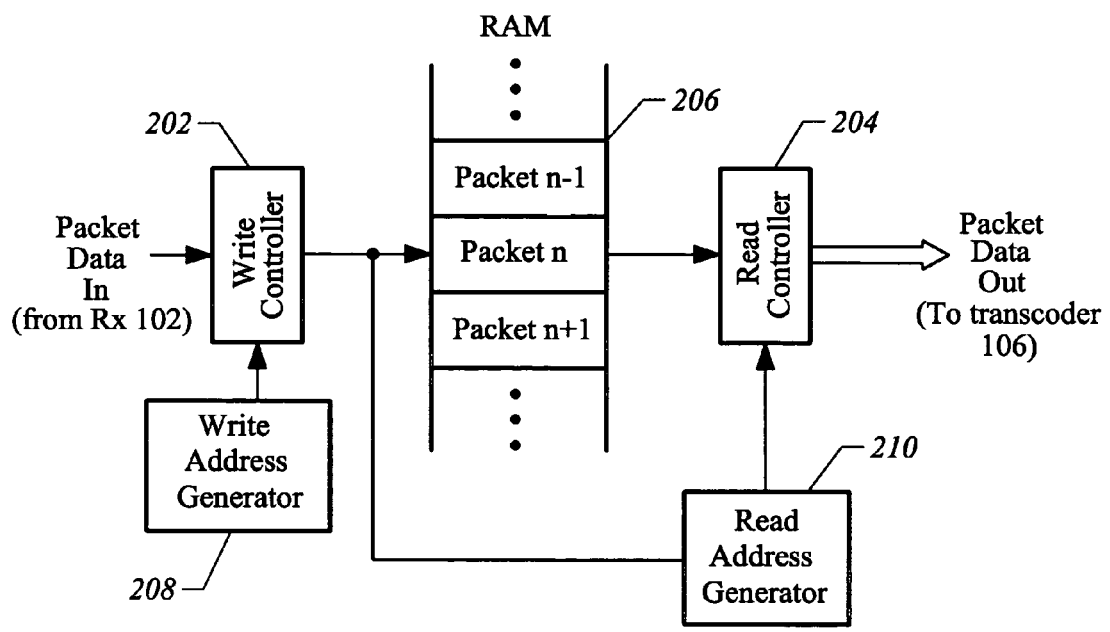
FIG. 2 illustrates a process for writing and reading received packets in accordance with an embodiment of the invention.

FIG. 2 shows the process of writing packets received from module RX 102 into the RAM 112 and the process of reading packets from the RAM and forwarding them to the transcoder 106, according to one embodiment. The Write Controller 202 and the Read Controller 204 can be implemented as Direct Memory Access (DMA) processes using software-generated descriptor lists, for example, wherein each descriptor specifies a source address, a destination address, and the number of bytes to transfer. The example shown in FIG. 2 depicts a representative Write Controller 202 based on sequentially increasing addresses as generated by Write Address Generator 208. That is, the destination address corresponding to the start of the next transfer is derived by taking the destination address corresponding to the previous transfer and incrementing it by an amount equal to the size (e.g. size of one or more packets) of the preceding transfer. A packet will therefore follow immediately after the end of the preceding packet without any gap or space in between. Upon exceeding the maximum address of the RAM 206, the next address for writing is reset to the starting address of the RAM. A more complex implementation could involve a free list, or the like, to more efficiently manage all of the available memory.

Figure 3:
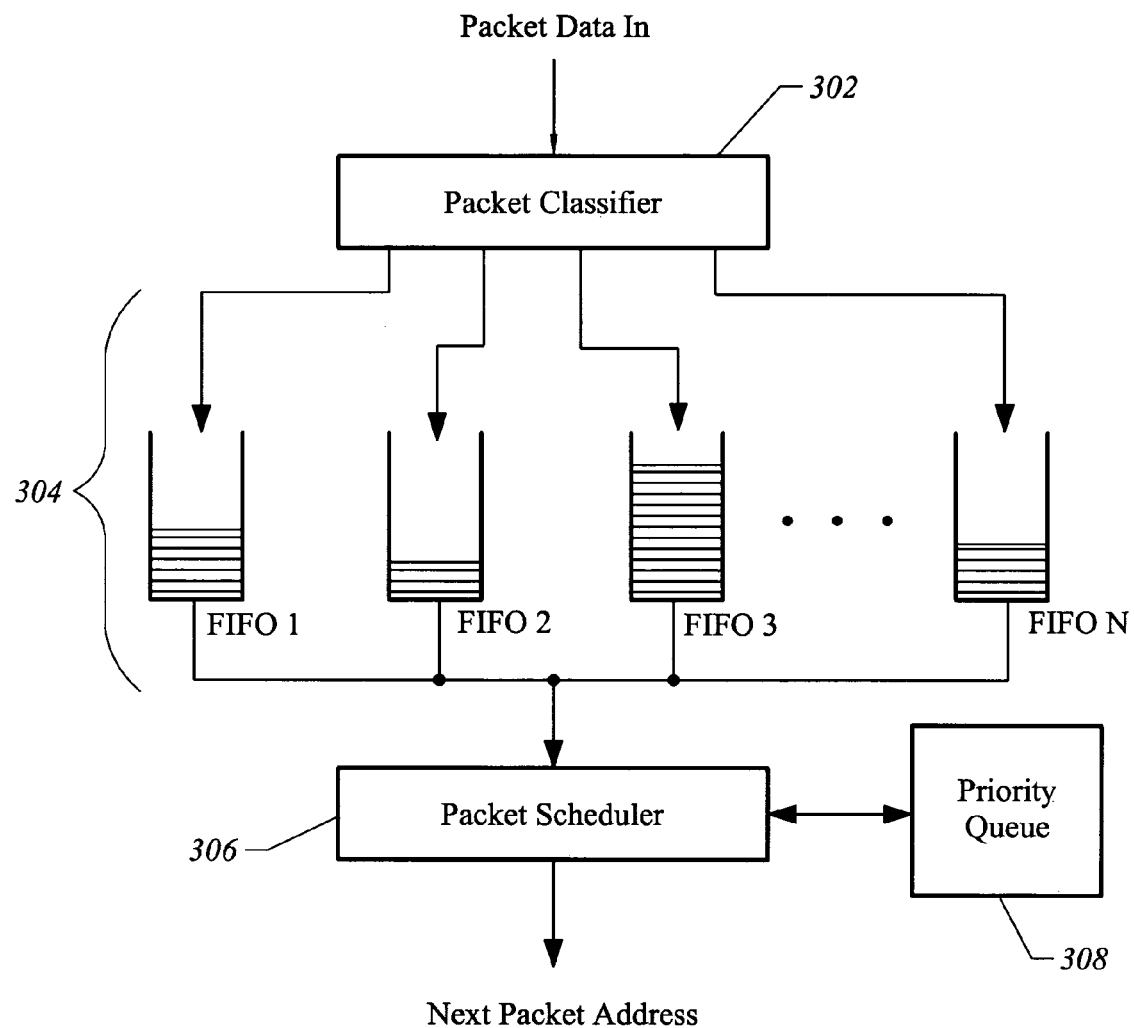
FIG. 3 illustrates a read address generation scheme in accordance with an embodiment of the invention.

Typically the process of reading packets from the RAM 206 is more complex than the writing process, since this is where the prioritization and scheduling processes are often implemented. One way to model the Read Address Generator 210 is shown in FIG. 3. The Packet Classifier 302 identifies the stream corresponding to each incoming packet and assigns a priority, in at least one embodiment, based on information in the packet headers. FIFOs 304, Packet Scheduler 306 and Priority Queue 308 are discussed below. A particular implementation of the Packet Classifier is described by the flowchart shown in FIG. 4.

Each time a packet is received and stored in RAM 206 of FIG. 2, a tag is assigned, for example by Packet Classifier 302, to represent the packet. The tag is comprised of the RAM address where the packet is stored, and the packet priority, which is determined by the Packet Classifier. One of the most effective ways to assign priorities is to consider the latest possible time by which the next packet (or information derived by processing the packet) must be delivered to the receiver where the video is to be displayed. The Earliest Deadline First (EDF) scheduler, shown implemented in FIG. 4, assumes an inverse relationship between this deadline and the priority of the packet.

For real-time video and audio streams, each packet deadline can be uniquely determined. For example, particular video and audio packets encoded using the MPEG transport stream protocol include time stamps embedded in the packet headers. A time stamp is usually included in each packet that begins a new frame. The time stamps specify that the receiver is to begin decoding the next frame when the current time becomes equal to (or is greater than) the time stamp corresponding to that frame. If the entire frame has not been received and is not present in the buffer of the receivers by this time, then a disruption of the playback process occurs and additional steps are performed to recover the correct playback synchronization.

This method of timing the playback process works well when the receiver 102 of FIG. 1 is able to synchronize to the same clock that was used by the encoder that generated the time stamps. For this reason, MPEG-encoded transport streams also include embedded time reference parameters, known as program clock references ("PCRs"), which are used by the receiver to reconstruct the original clock. Each time reference specifies the current value of the original clock at the time that the time reference was emitted from the encoder. In between the time reference samples, the clock is continuously extrapolated at the MPEG-specified rate of 27 MHz. Even though the precise frequency and stability of this local clock generator will depend on the clock used at the encoder, the receiver should be able to synchronize and recover this original clock, for example, with a phase-locked frequency tracking loop and the time reference parameters (PCRs) embedded in the bit stream.

Figure 4:
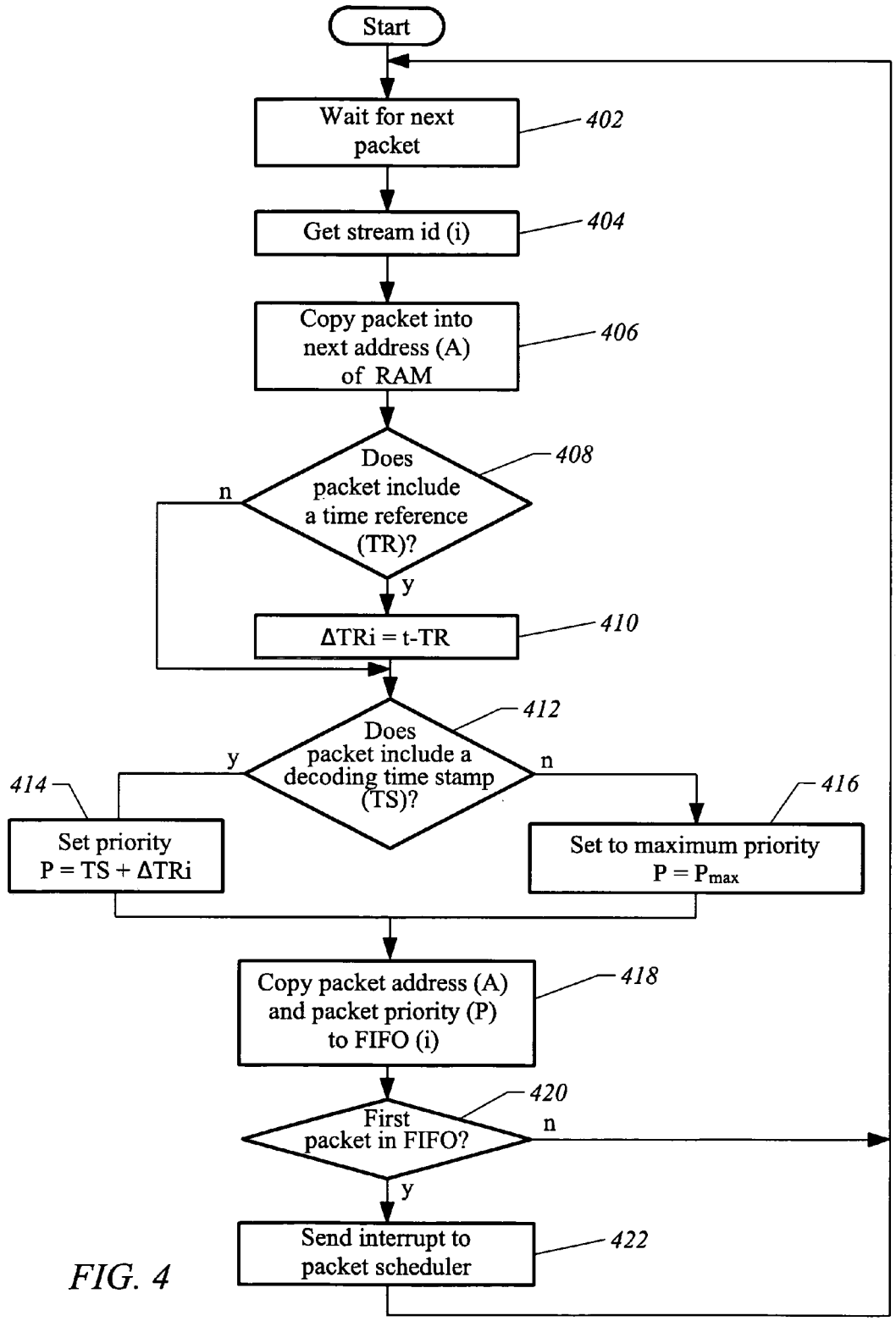
FIG. 4 illustrates a packet classifier technique utilized in accordance with an embodiment of the invention.

The Packet Classifier 302 of FIG. 3 can operate as shown in the flowchart process of FIG. 4, which includes a simple method of converting the time stamps detected on different streams to a single common clock reference. After waiting for a next packet at 402, a packet is received and is stored in RAM at 406. When a time reference is detected at 408 for a particular stream i received at 404, it is used to calculate $\Delta TR_i$ at 410, which is the difference between the current local time t (based on an emitter clock of, for example, a 27 MHz clock) and the value of the time reference.

When a time stamp is detected at 412 in a packet corresponding to stream i, the new priority is set equal to the sum of this time stamp and the most recent $\Delta TR_i$ corresponding to this stream at 414. Each time a packet is received without a time stamp, it is assumed to correspond to the same frame as the previous packet of the same stream, and the priority could therefore remain unchanged in one embodiment. However, in another embodiment, the priority is instead set to the maximum value at 416 in order to ensure that such packets have precedence over any packet that begins a new frame. It should also be noted that some MPEG encoding models do not require that each successive frame include a time stamp. If such infrequent time stamps are permitted, then the frames that do not include time stamps should be detected by examining the packet headers at 412, and the effective time stamp should be inferred by extrapolating a previous time stamp based on the frame rate. The frame rate can also be inferred from information contained in the packet headers.

Figure 5:
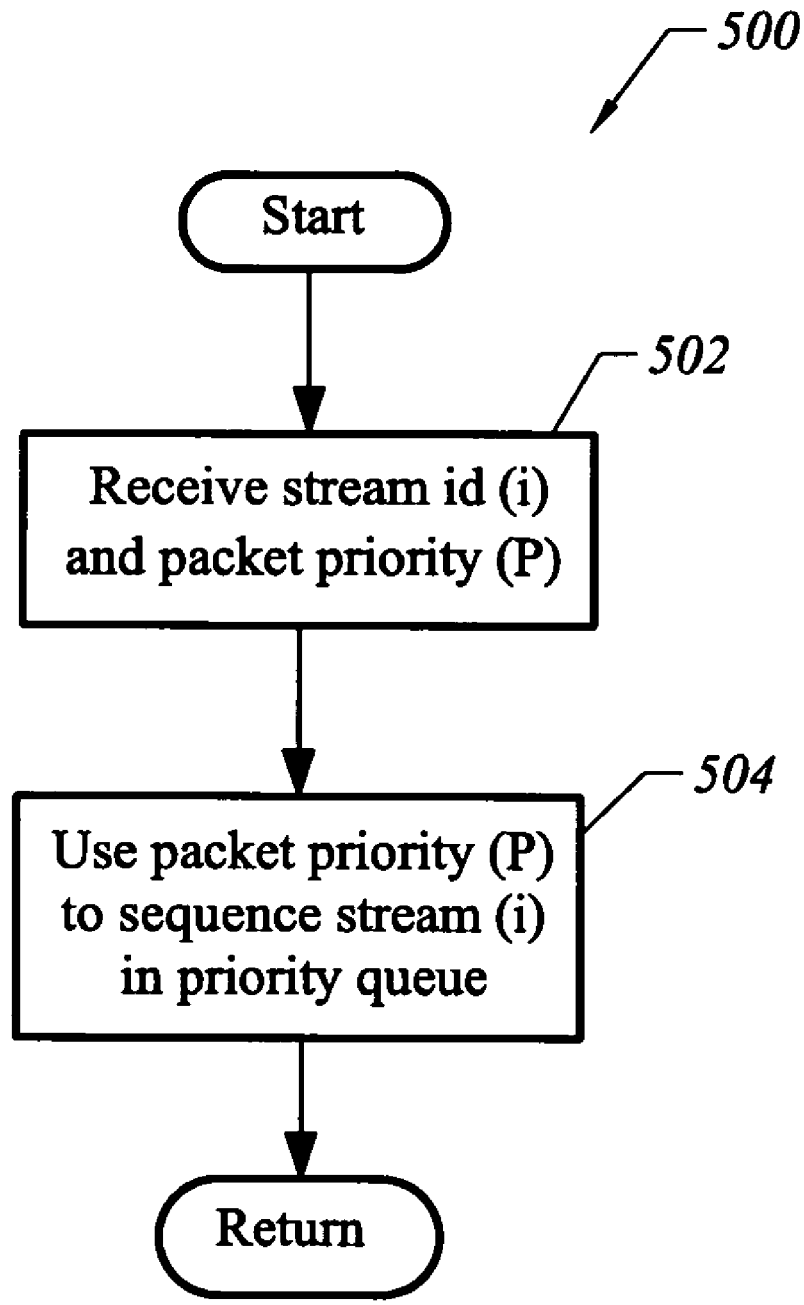
FIG. 5 illustrates interrupt processing in a packet scheduler of the invention.

Once a packet has been assigned a priority by the Packet Classifier 302 in FIG. 3, it is then assigned a tag that is deposited at 418 of FIG. 4 in a First-In-First-Out memory (FIFO) 304 of FIG. 3 that is associated with the particular stream. The tag includes two parameters: the assigned packet priority and the address of the packet in RAM. Similar FIFOs are maintained for each of the packet streams, each containing a sequence of tags corresponding to the priorities and addresses of the packets that have been received on that stream. Each time a new tag is inserted into a FIFO 304 of FIG. 3 that was previously empty at 420, an interrupt signal is sent at 422 to the Packet Scheduler 306 of FIG. 3. The primary task of the Packet Scheduler 306 is to continuously monitor the next tag at the output of each FIFO 304 of FIG. 3 and to sort the various streams according to the priorities specified by these next tags. The resulting ordered list is referred to as the Priority Queue 308. If an interrupt is received from the Packet Classifier 302, this means that there is a new next tag present at the output of the FIFO 304 corresponding to the stream associated with the packet that triggered the interrupt. Since the FIFO 304 was previously empty at 420, the stream is not currently listed in the Priority Queue 308, and therefore a new entry must be inserted. The Packet Scheduler 306 determines where this new entry should be inserted into the Priority Queue 308 by comparing the priority associated with the new entry with the priorities of the existing entries in the queue. Since the Priority Queue 308 is always sorted according to priority, this process simply involves locating the pair of consecutive entries having priorities that are respectively less than and greater than (or equal to) the priority of the new entry, and inserting the new entry in between this pair. If an entry with higher (or equal) priority does not exist, then the new entry is placed at the head of the Priority Queue 308, and similarly, if an entry of lower priority does not exist, then the new entry is inserted at the end of the Priority Queue 308. Computationally efficient methods for creating and maintaining such sorted lists are well known and therefore will not be discussed in any further detail. A simple flowchart 500 describing the operation of the Packet Scheduler 306 in response to an interrupt is shown in FIG. 5. At 502, a priority is received for each stream and issued at 504 to prioritize the queue.

Figure 6:
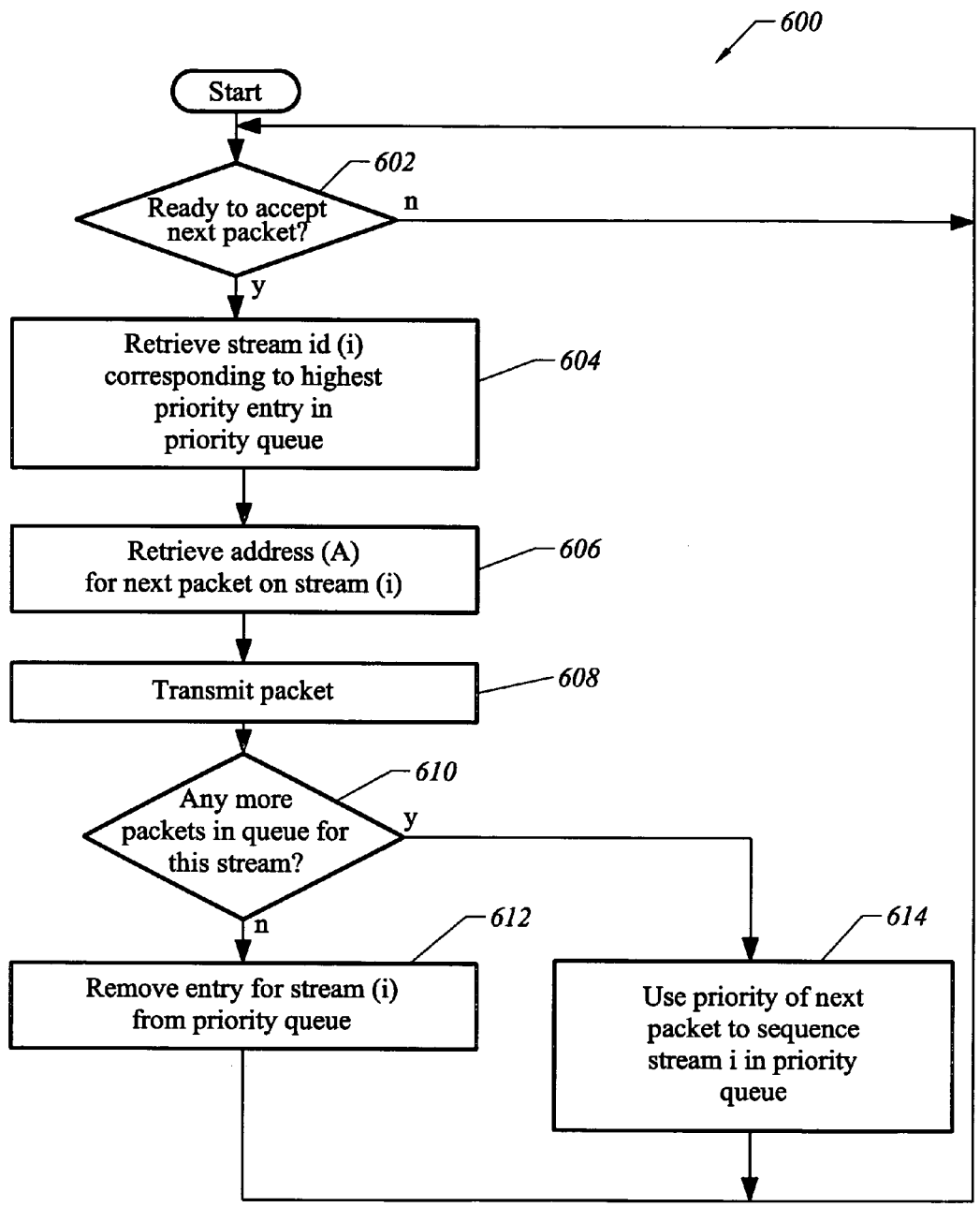
FIG. 6 illustrates packet scheduler sorting performed in accordance with an embodiment of the invention.

A flowchart 600 describing the primary sorting task of the Packet Scheduler 306 of FIG. 3 is shown in FIG. 6. Each time the transcoder is ready to accept a new packet at 602, the Packet Scheduler 306 selects the next packet at 606 corresponding to the highest priority stream at 604 in the Priority Queue 308. Processes such as transcoding and other operations related to video encoding and decoding are greatly simplified by disallowing any inter-stream switching in the middle of a frame. Therefore, the Packet Scheduler 306 will wait until it has supplied the last packet of the current frame at 610 before it will switch to a packet corresponding to any other stream. In this case, the constraint of switching streams only at frame boundaries is handled automatically, since the Packet Classifier 302 always assigns a lower priority to the first packet of a frame than it assigns to the following packets. In other words, if the next packet on the current stream is not the first packet of a frame, then it will always have a priority value that is higher than that of the next packet in any of the other FIFOs.

The last task of the Packet Scheduler 306, once a packet has been selected for transmission at 608, is to update the Priority Queue 308. After the tag for the selected packet has been removed from the corresponding stream FIFO 304, the priority of the next tag must be examined. If there are no other tags contained within the FIFO, then the entry for this stream in the Priority Queue 308 must be removed at 612. If the FIFO is not empty at 610 and the next packet corresponds to a different frame, then the corresponding entry for this stream in the Priority Queue 308 must be repositioned in order to maintain the proper sequencing at 614 based on decreasing priority.

The method that has been described for reading packets from a central memory unit, for example, and using a Packet Classifier 302 to assign corresponding packet tags to a plurality of FIFOs 304 and using a Packet Scheduler 306 to read the packet tags and output the packets to the transcoder, has two important advantages. First, the packets are prioritized in an optimal way, which insures that packets are delivered in time to avoid disrupting the playback of real-time video and audio while minimizing latency on all other streams. Second, the prioritization and scheduling processes are computationally efficient. The Priority Queue 308 maintains an up-to-date list of the different streams sorted according to priority, and the entries only need to be adjusted on a relatively infrequent basis. This makes it possible to use a single inexpensive processor to manage the sorting and scheduling process for a large number of video streams.

A single time-multiplexed processing system benefits from the reduction in any logic, CPU, and memory resources associated with the process implementation. All of these resources would need to be replicated multiple times if a dedicated processor were provided for each stream. On the other hand, an exemplary time-multiplexed process may need additional memory to save the current processing state each time processing of the current stream is suspended, and processing of the next stream begins. Otherwise it would not be possible to resume execution of the first stream at the same point of the interruption. In the previous example, state information can be included in the transcoder memory module 108 of FIG. 1. Alternatively, the state information could be included in the main RAM memory 112 if more complex read and write controller implementations were adopted. The term "saving state" can refer to the process of writing this state data into memory, whereas "restoring state" refers to the retrieval of the state data from memory.

The amount of state that must be saved each time the processing of a stream is suspended depends on the particular process. Most video encoding, decoding, and transcoding processes based on compression standards such as MPEG, require that at least one frame of pixels be included in the saved state. These compression systems use a technique known as temporal prediction, where each frame is first predicted based on one or more frames that have already been encoded, and then only the difference between the temporal prediction and the actual pixels are further compressed. Frames, which utilize this sort of prediction, are sometimes referred to as P-frames. Other frames, known as I-frames, are usually transmitted less frequently and do not make use of temporal prediction. Compression of I-frames is relatively inefficient but since no previous frames are needed, they can be decoded even after transmission or recording errors have been encountered in the bit stream, or when tuning to a new bit stream where no previous information is available. Other types of frames, known as B-frames, utilize predictions from two different frames, one that proceeds and one that follows the B-frame when the frames are sequenced in display order. In order to utilize B-frame prediction, the frames must be transmitted out of order so that both predictor frames can be present at the receiver when the encoded B-frame is received.

Figure 7:
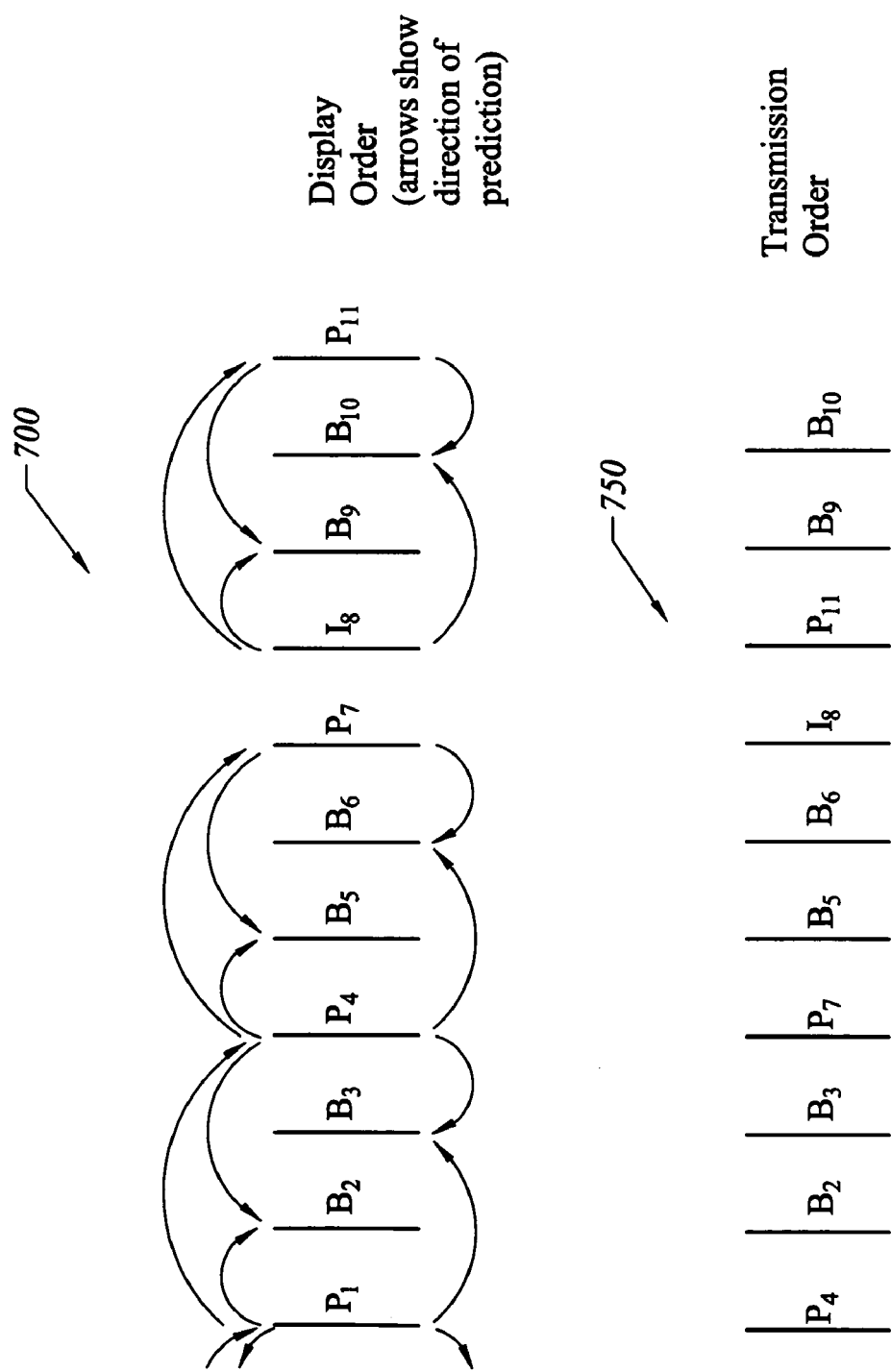
FIG. 7 illustrates the difference between display order and transmission order of sequences that make use of B-frames.

FIG. 7 illustrates the difference between display order 700 and transmission order 750 of sequences that make use of exemplary B-frames. The number of B-frames between each pair of successive P-frames (e.g., P1, P4, P7, P11) is an encoding variable, which can be changed from time to time.

In many cases, the amount of memory that must be allocated for the storage of the previous frames needed for the prediction of future frames can be significantly reduced by carefully selecting the point where an interruption is to occur. For instance if an interruption were to occur when the next frame to be transmitted is a B-frame, then two frames would need to be saved in memory. Alternatively, if the interruption were to occur prior to receiving a P-frame or an I-frame, then only one frame would need to be saved.

Therefore, if the goal is to conserve memory, then each stream should be interrupted just prior to the transmission of a P-frame or I-frame. This modification is easily incorporated into the design of the Packet Classifier 302. The artificially high priorities that were assigned to the packets that did not begin a new frame could also be assigned to the packets that begin a new B-frame. This would effectively prevent the processor from being interrupted unless the next packet corresponded to either an I-frame or a P-frame. In practice, the priority of the first packet of a B-frame should only be biased upwards by a relatively small amount. This way, if the stream continues with a large number of successive B-frames, it might eventually lose its priority advantage, and an interruption may occur before the next stream becomes critically late.

In many cases, compressed video sequences can be structured to include I-frames, which are immediately followed by a P-frame. The group of frames beginning with such an I-frame and ending with the frame immediately preceding the next such I-frame, is known as a closed group of pictures (closed "GOP") since all of the frames in the group can be decoded without references to frames that are outside of the group. If the processing of a bit stream is interrupted just prior to the beginning of such a closed GOP, then no frames need be saved in memory. However, it may not always be possible to wait for a closed GOP to begin, as they are usually transmitted at a rate of only 1 or 2 per second. At this rate, it might not be possible for a single processor to serve a large number of streams unless considerable latency was designed into the system and large buffers provided to queue the bit stream data while waiting to be processed.

Some of the most recent compression algorithms permit both P-frames and B-frames to use temporal prediction using an arbitrary number of previously transmitted frames. A version of the MPEG-4 standard (also known as H.264), is an example. In such compression systems, the amount of state that must be saved when processing is interrupted is significantly increased. Also, in such cases, it may be difficult to optimize memory usage for maintaining state during interruptions unless there continues to be a difference in the number of frames needed for the prediction of different frames and this variation is known in advance.

Although most of the memory needed for maintaining state is generally consumed by frames that will be needed for the prediction of other frames that are yet to be received, some memory must also be allocated for the encoding parameters which can vary between streams, or from frame to frame of any single stream. These parameters are specific to the encoding algorithms and, in the case of decoding and transcoding processes, are usually embedded in the headers of the various data encoding layers.

Depending on the video compression algorithm and the policy for suspending and saving state, the amount of memory needed for the single processor, time-multiplexed implementation could be comparable to the amount of memory needed to support multiple independent processors, each dedicated to a single stream. But there are advantages to using a single large memory unit, and a single memory controller interfaced to a single system. If the single memory unit is serving a single processor, as opposed to many processors, then complex arbitration policies can be omitted from the design and less time will be spent waiting for memory access. The memory can also be allocated as needed for processing each of the streams, instead of pre-allocating the maximum amount of memory that could be required for each individual stream. The statistical benefit is similar to the improved efficiency resulting from the sharing of other processing resources, and in this case, allows the system to be designed with less total memory.

One of the complications arising from a statistical memory allocation model is in the design of the memory allocation policy. Typically, the memory allocater would receive requests for contiguous memory blocks, equal to the size of an entire frame, and since the size of each frame may vary from stream to stream, or even within a single stream, the allocater should ensure that sufficiently large blocks of free memory are always available. Steps must be taken to avoid excessive fragmentation that could occur over time as new blocks continue to be allocated and old blocks continue to be released.

Figure 8A:
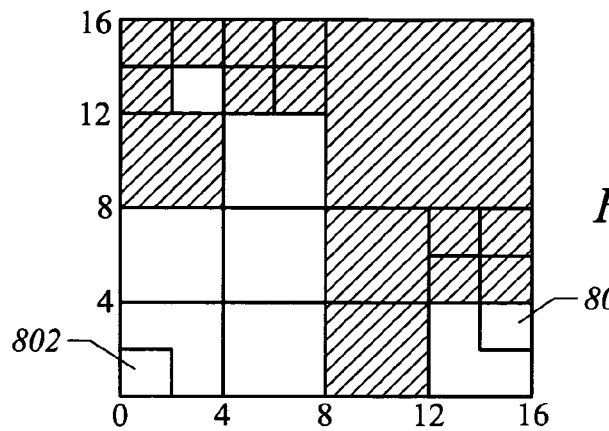
FIGS. 8A–8D illustrate memory management policies that may be used in accordance with an embodiment of the invention.

An example of a suitable memory management policy is shown in FIG. 8A. In this case, the memory is allocated into blocks 802 with horizontal and vertical dimensions equal to the total horizontal or vertical dimension respectively, divided by n, where n is an integral power of 2. The policy is to allocate the smallest block possible, which is equal to or larger than the dimensions corresponding to the request.

Figure 8B:
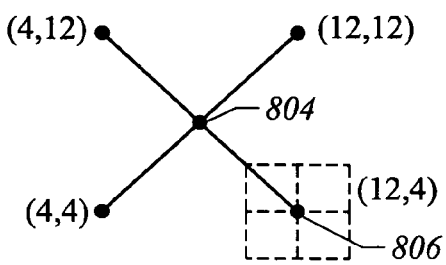
Figure 8C:
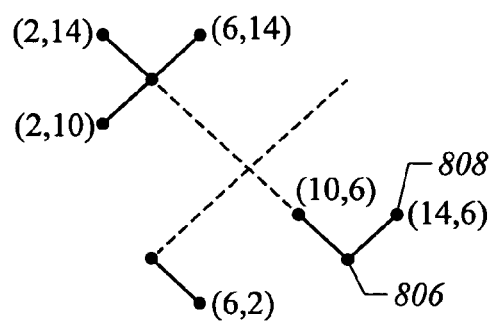
Figure 8D:
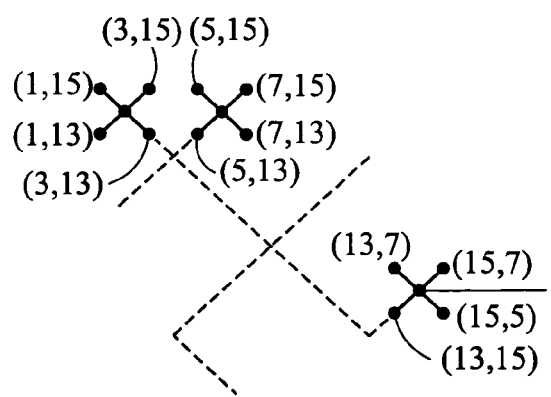

FIG. 8A can also be modeled by a quad-tree structure as shown in FIGS. 8B, 8C, and 8D. The root of the tree is the center 804 of the entire memory area. Each time a new block of memory is allocated, branches extending from center 804 to the center of the newly allocated block extend the tree. Each single branch can only be drawn from the center of a block to the center of one of the four quadrants (i.e., to the center of a Quad of blocks, such as quad center 806) of which the block is comprised. FIG. 8B shows the branches of the first or root level of the tree. FIG. 8C shows the branches of the second level, while FIG. 8D shows the branches of the third level. Branches at lower levels are shown in dashed lines. The horizontal and vertical coordinates of each branch point corresponds to the scale used in FIG. 8A.

In this example, the block is always square in dimension, but rectangular regions can be easily supported as well as other geometries. For example, rectangular regions of any aspect ratio can be modeled without complicating the implementation simply by applying a fixed scale factor to all horizontal parameters, or alternatively to all vertical parameters. Blocks can also be subdivided in only one dimension instead of two, and although the generalization is straightforward, it introduces additional complexity, and therefore is not included in the examples.

An example of portions of source code for assigning and releasing blocks of memory, according to this policy, is provided in FIGS. 9 and 10 respectively. The parameter d, provided as input to function mem_allocate, is the horizontal and vertical dimension of the requested block of memory. The parameters i and j are the vertical and horizontal coordinates, respectively, corresponding to the center of the block from which the requested memory block is to be assigned. The parameter k is one half the horizontal and vertical dimension of this block that is centered at coordinates i and j. The function is initially called with i, j, and k referencing the full memory block representing the entire region illustrated in FIG. 8A. The allocater then determines whether the current memory block (with center ij and size determined by k) is larger than needed, and if so, the block is subdivided into quadrants by recursively calling mem_allocate with parameters i, j, and k updated to reference one of the 4 sub-quadrants. When a suitable sub-quadrant is identified, the physical address addr(i,j) corresponding to the top left corner of the block centered at vertical coordinate i and horizontal coordinate j, is returned. The quantity D(i,j) is always maintained to indicate the largest block available for allocation within the block centered at coordinates i and j.

The parameters i and j, provided as inputs to function mem_free, are the vertical and horizontal coordinates, respectively, of the memory block that is no longer needed and is ready to be released. The parameter k is the corresponding dimension of this block. The memory is effectively released by updating the quantity D(i,j) for the current block and all larger blocks in which this block is contained.

An exemplary method of partitioning the main memory by subdividing a block into equal-sized quadrants can be improved. First, some level of fragmentation can still exist and result in the inability to service a request for additional memory. Second, if the size of the requested memory block does not precisely match the size of one of the subdivided quadrants, then the assigned memory block will be oversized and the extra space will be wasted. According to another embodiment of the present invention, a method partitions the main memory into small blocks of a fixed size as exemplified in FIG. 11. These blocks, referred to as "pages," can be made much smaller than the size of a typical frame. Hence, when a new frame is to be saved in memory, many pages 1102 should be allocated. A relatively small amount of memory may be wasted if the horizontal and vertical dimensions of the frame are not integral multiples of the horizontal and vertical page dimensions, respectively, but this wastage should be negligible if the page dimensions are suitably small. In practice the optimal page size is selected by balancing the cost of possible wasted memory with the cost of managing additional pages.

The memory management functions include keeping track of all unallocated pages 1110 and allocating such pages when new memory is needed. The physical addresses corresponding to the unassigned pages can be maintained, in one embodiment, as a free list organized as a simple first-in-first-out buffer (FIFO). That is, a page's address can be inserted into one end of the free list buffer 1104 of FIG. 11 when the page is released and a page can be removed by popping the address at the other end of the free list when a new page is to be allocated.

Page management can also be used to keep track of the virtual addresses associated with each of the pages currently in use. A virtual address can be comprised of a stream id, a frame id within the stream, and the horizontal and vertical coordinates within the frame. The mapping of the virtual address to the physical address of the page can be implemented, for example, with a simple look-up table such as the Translation Look-Aside Buffer (TLB) 1106 of FIG. 11. In this case, the cost of the page management function is little more than the cost of the FIFO 1104 for maintaining the free list, and the cost of the TLB for maintaining the address mappings.

Although most of the memory management processes can be implemented in software, a partial hardware implementation according to another embodiment may be desirable to speed up the processing that occurs within a frame. For example, if other factors dictate the use of custom hardware for compression-related processing tasks within a frame, as well as the use of software for managing the interrupts and the frame-to-frame transitions, then it is possible to download only a relatively small number of page addresses to the sub-process that is implemented in hardware. If this download is performed prior to beginning each new frame, then it is only necessary to transfer the page addresses corresponding to the memory that can be referenced while processing the next frame. This includes all of the pages comprising the frames that can be used for temporal prediction and all of the pages that will be needed to save the output frame, if needed for the temporal prediction of frames that will follow. The allocation of memory for the output frame can be done by reclaiming the same pages that were used by a temporal predictor frame that is no longer needed, or by extracting new pages from the free list.

Figure 12:
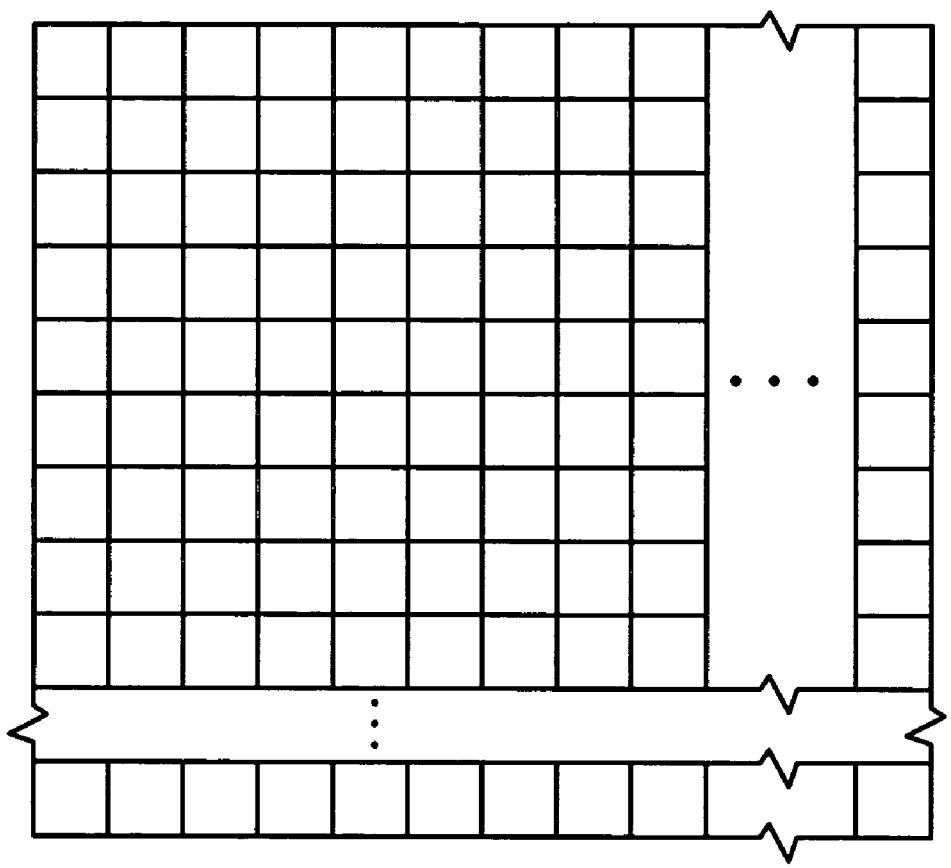
FIG. 12 illustrates linear memory addressing within a page in accordance with an embodiment of the invention.

In most compression systems, memory is accessed in very small blocks, typically ranging from 4×4 pixels to 16×16 pixels. Assuming that the page size is significantly larger than this size, it becomes advantageous to further subdivide the pages into smaller sub-blocks of a fixed size that is similar to the size of a typical access. Although a single frame may be comprised of multiple pages distributed randomly throughout main memory, the sub-blocks are typically sequenced in order, such that all pixels within a page collectively comprise a single contiguous rectangle within the frame. This linear addressing within a page is further illustrated in FIG. 12.

Figure 13:
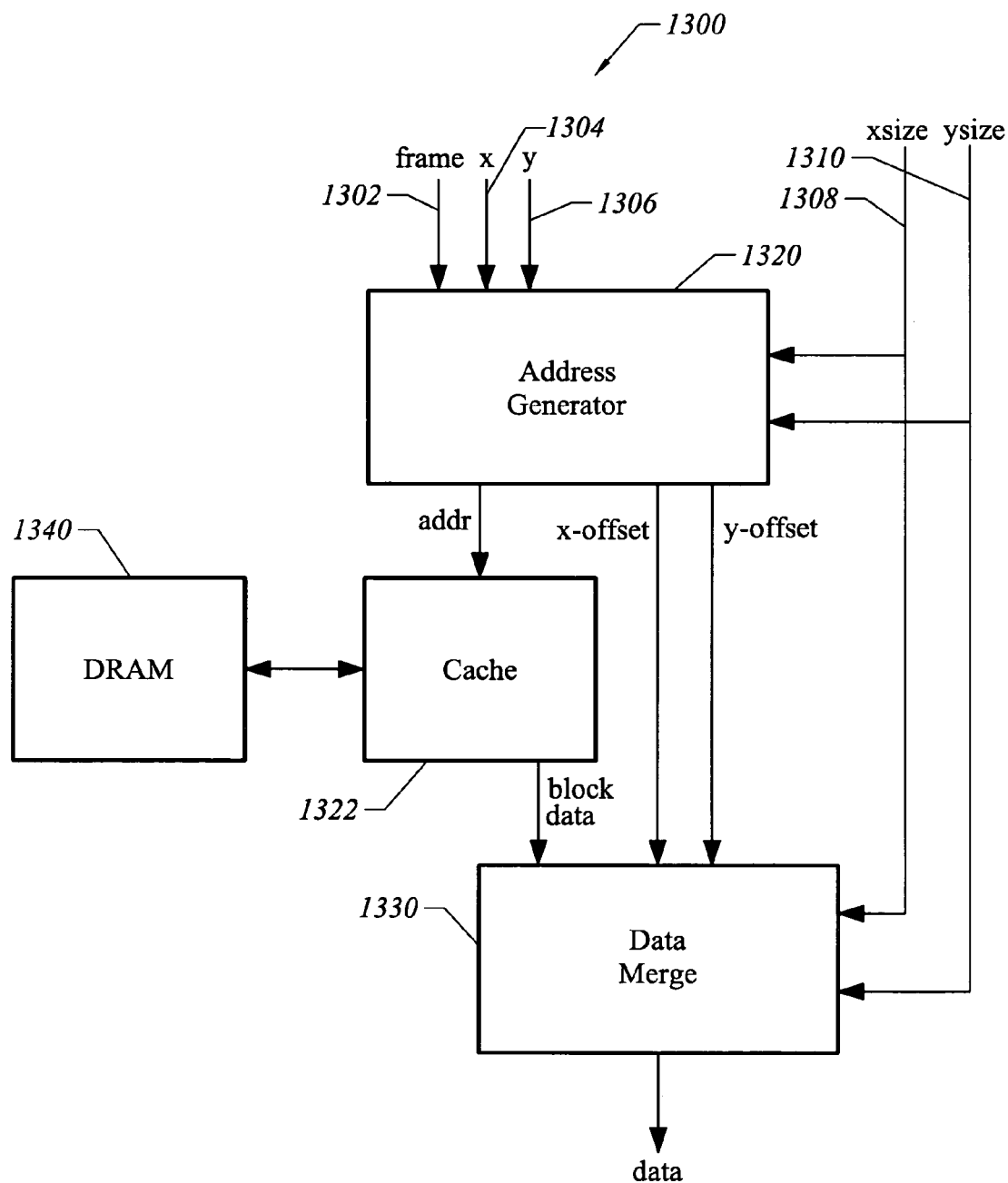
FIG. 13 illustrates memory access hardware that may be utilized in accordance with an embodiment of the invention.

An example of the hardware 1300 that can be used to access the main memory, according to a specific embodiment, is shown in FIG. 13. While processing a single frame of any given stream, a memory access request is generated by specifying the frame-id (frame 1302), the vertical coordinate within the frame (y) 1306, and the horizontal coordinate within the frame (x) 1304. The vertical and horizontal size of the requested memory block is specified by ysize 1310 and xsize 1308 respectively. The address generator 1320 compares the location and boundaries of the requested region with the location and boundaries of adjacent pages and sequentially supplies the cache unit 1322 with the address of all pages needed to complete the request. The address generator 1320 also outputs the offset within each page to the data merge module 1330. An example of code used to implement the address generator is provided in FIG. 14. In this case, the sub-block size is assumed to be 16 by 16 pixels.

The operation of an exemplary cache module 1322 is described next. If the page corresponding to the address supplied by the address generator already exists in the cache, then the page is supplied directly to the data merge module 1330. Otherwise, if the page does not exist in cache 1322, then the data is first retrieved from external DRAM 1340 and then provided to the data merge module.

The data merge module 1330 uses the page offset information received from the address generator 1320 to select a sub-region within each page that is received from the cache t 1322. An example of code used to implement the data merge module 1330 is provided in FIG. 15. In this example, module 1330 can buffer an entire row of sub-blocks in order to output the requested block of pixel data in conventional raster scan order.

Figure 16:
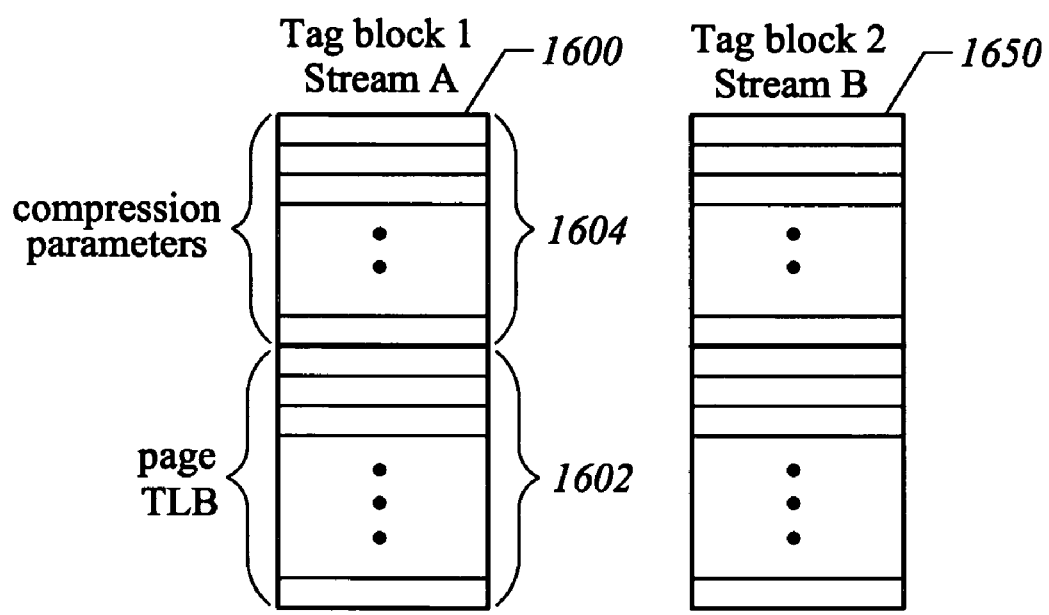
FIG. 16 illustrates parameters that may be required in accordance with an embodiment of the invention during compression of a single frame.

A simple representation of the parameters required during the compression of a single frame is shown in FIG. 16. The representation is referred to as a tag block and includes page addresses 1602 as well as parameters 1604 that are needed to implement the process. For example, such parameters may include the frame size, the compression ratio, the frame type (I, P, or B), motion vector search ranges, etc. One way to efficiently transition from the processing of one frame to the processing of the next frame is to use two or more tag blocks. While the first frame is being processed, only one tag block 1600 may be in use. During this time, the second tag block 1650 can be downloaded in order to provide information associated with the next frame that is scheduled for processing.

In the case of two tag blocks, a single bit can identify the tag block that is currently in use. After the frame has been completely processed, the bit is toggled in order to identify the other tag block. If the second tag block is preloaded in parallel with the processing of each frame, then processing of the second frame can begin immediately, and inter-frame delays are thereby avoided.

Figure 17:
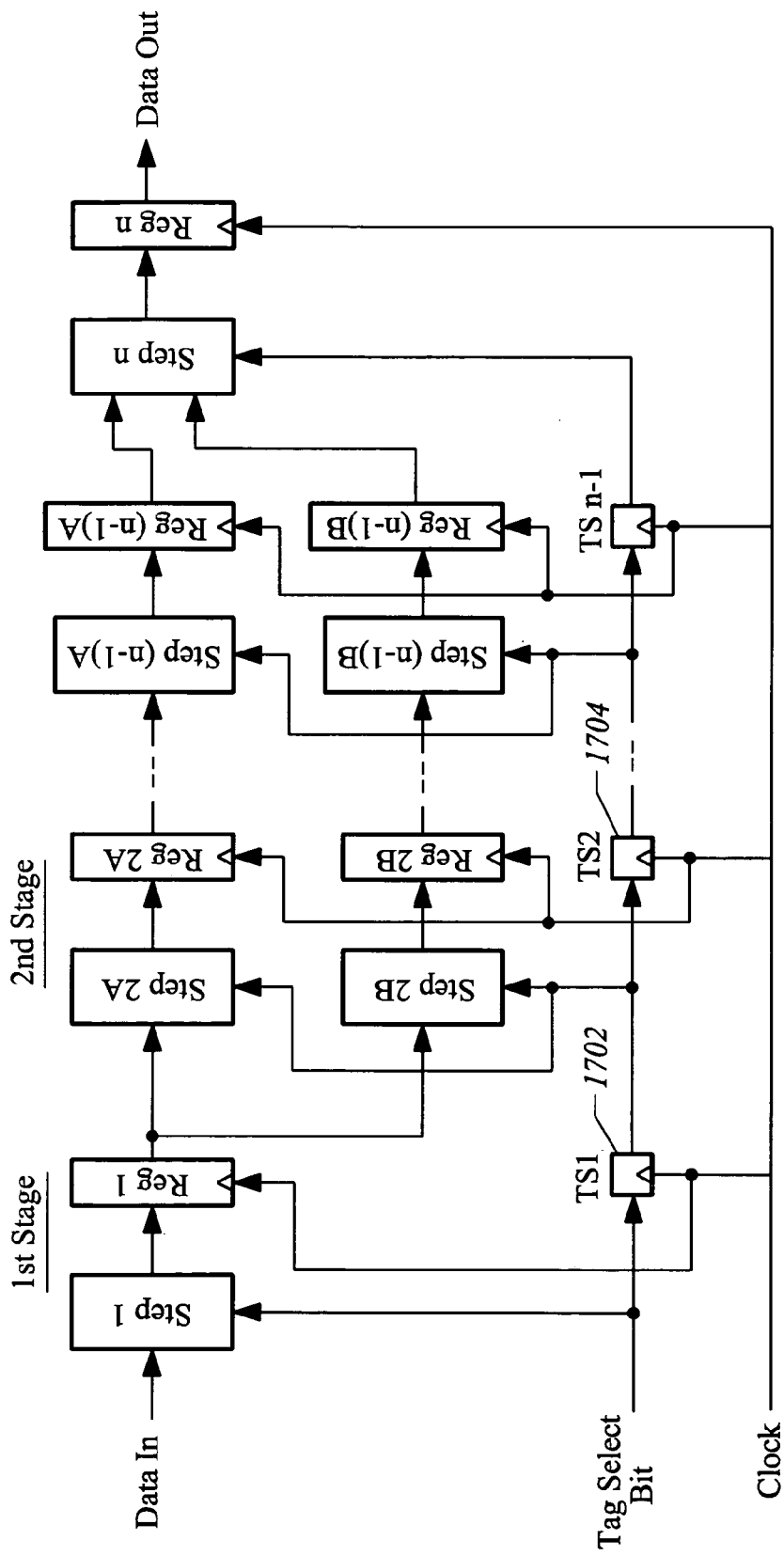
FIG. 17 illustrates an independent tag block select bit technique for pipeline stages in order to avoid inter-frame delay, according, to an embodiment of the invention.

In practice, a hardware implementation of the frame processor is likely to be pipelined, with different operations performed in parallel, and each operation corresponding to a different point in time. In such cases, the toggling of the tag block select bit could be delayed until the entire pipeline is empty after the entire frame has been processed. However, this could introduce extra delays before the processing of the next frame could begin, and depending on the number of pipeline stages, this delay time could be significant. One way to avoid incurring this inter-frame delay, according to a specific embodiment, is to maintain an independent, tag block "select bit" for each stage of the processing pipeline. This is shown in FIG. 17. Once the first pipeline stage generates the last data word corresponding to the end of the current frame, the tag block select bit 1702 corresponding to that pipeline stage is toggled, and data corresponding to the beginning of the next frame can be accepted upon the next clock cycle. Upon each successive clock cycle, the tag block select bit 1704 for the next pipeline stage is toggled, and this-continues until the entire process has transitioned from the first frame to the second, The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method for processing a plurality of digital streams, wherein each digital stream includes packets sequenced for continuous presentation, said method comprising:
receiving packets for each of said plurality of digital streams and storing said packets in a buffer;
associating each of said packets with a respective stream of said plurality of digital streams;
assigning a priority to each packet, said priority being determined according to a delivery deadline for each of said packets;
assigning a tag to each to each packet identifying the assigned priority for the packet and an address of the packet in the buffer;
storing each tag in memory corresponding to the respective digital stream associated with each packet;
continuously monitoring the tags positioned at the memory output to identify the digital stream having the highest priority;
retrieving the packet identified by the tag at the output of the memory corresponding to the identified highest priority stream from the buffer according to said address;
determining when a new tag is present at the output of the memory after a gap in said tags for a particular one of the digital streams;
establishing the priority of the digital stream corresponding to said new tag with respect to the priority of the other digital streams; and
processing the packets from the plurality of data streams in order of priority.

2. The method of claim 1, further comprising:
selecting said packets for processing based on said priority; and
retrieving said selected packets from said buffer.

3. The method of claim 1, wherein:
said packets are retrieved in order of said priority.

4. The method of claim 1, further comprising:
assigning a priority to each of said plurality of digital streams.

5. The method of claim 4, wherein:
said assigning of said priority to each packet further comprises determining the priority of the stream associated with each packet.

6. The method of claim 1, wherein:
said priority is based on a current time interval before said deadline.

7. The method of claim 6, wherein:
said deadline is derived from a Decoding Time Stamp extracted from an associated packet header.

8. The method of claim 1, wherein:
said packets of each digital stream are arranged in sequences of packets.

9. The method of claim 8, wherein:
each sequence of packets is a representation of a video frame.

10. The method of claim 8, wherein:
each sequence of packets is a representation of an audio frame.

11. The method of claim 1, further comprising:
maintaining a state associated with each of said plurality of digital streams.

12. The method of claim 11, wherein:
said state includes parameters for said processing of said packets of each stream.

13. The method of claim 11, wherein:
said state includes pixel data representing at least one frame of video.

14. The method of claim 11, further comprising:
allocating memory for storing said state.

15. The method of claim 14, wherein:
said allocating memory includes recursively subdividing said memory into quadrants, where one of said quadrants cannot be further subdivided without at least one dimension becoming smaller than a corresponding dimension of a video or audio frame.

16. The method of claim 14, wherein:
said memory is allocated in pages, where each of said pages is a contiguous memory unit of a fixed size.

17. The method of claim 16, wherein:
unallocated pages are managed using a free list configured to manage unused pages of memory.

18. Apparatus for processing a plurality of digital streams, wherein each digital stream includes packets sequenced for continuous presentation, said apparatus comprising:
means for receiving packets for each of said plurality of digital streams and storing said packets in a buffer;
means for associating each of said packets with a respective stream of said plurality of digital streams;

means for assigning a priority to each packet, said priority being determined according to a delivery deadline for each of said packets;

means for assigning a tag to each to each packet identifying the assigned priority for the packet and an address of the packet in the buffer;

means for storing each tag in memory corresponding to the respective digital stream associated with each packet;

means for continuously monitoring the tags positioned at the memory output to identify the digital stream having the highest priority;

means for retrieving the packet identified by the tag at the output of the memory corresponding to the identified highest priority stream from the buffer according to said address;

means for determining when a new tag is present at the output of the memory after a gap in said tags for a particular one of the digital streams;

means for establishing the priority of the digital stream corresponding to said new tag with respect to the priority of the other digital streams; and means for processing the packets from the plurality of digital streams in order of priority.

19. The apparatus of claim 18, further comprising:

means for selecting said packets for processing based on said priority; and means for retrieving said selected packets from said buffer.

20. The apparatus of claim 18, further comprising:

means for assigning a priority to each of said plurality of digital streams.

21. The apparatus of claim 20, wherein:

said priority of each packet is further determined by the priority of the stream associated with each packet.

22. The apparatus of claim 21, further comprising:

a means for extracting a Decoding Time Stamp from an associated packet header, wherein said Decoding Time Stamp is used to derive said deadline.

23. The apparatus of claim 18, wherein:

said priority is based on a current time interval before said deadline.

24. The apparatus of claim 18, further comprising:

means for maintaining a state associated with each of said plurality of digital streams.

25. The apparatus of claim 24, wherein:

said means for maintaining a state includes a memory for storing processing parameters.

26. The apparatus of claim 24, wherein:

said means for maintaining said state includes memory for storing pixel data representing at least one frame of video.

27. The apparatus of claim 26, further comprising:

means for recursively subdividing said memory into quadrants.

28. The apparatus of claim 26, further comprising:

means for partitioning said memory into pages, where each of said pages is a contiguous memory unit of a fixed size.

29. The apparatus of claim 28, further comprising:

a free list for managing unused pages of memory.

30. The apparatus of claim 28, further comprising:

a translation look-aside buffer for mapping virtual addresses to physical page addresses.

31. The apparatus of claim 28, further comprising:

means for retrieving pages from memory and merging data into blocks of a requested size.

32. The apparatus of claim 31, further comprising:

a cache for storing one or more pages that have been retrieved from memory.

* * * * *